(12) United States Patent
Hsieh et al.

(10) Patent No.: US 10,076,101 B2
(45) Date of Patent: Sep. 18, 2018

(54) PET LEASH STRUCTURE

(71) Applicants: Chun-Teng Hsieh, Changhua (TW); Tsung-Yu Hsieh, Changhua (TW)

(72) Inventors: Chun-Teng Hsieh, Changhua (TW); Tsung-Yu Hsieh, Changhua (TW)

(73) Assignee: Chun-Teng Hsieh, Changhua (TW)

( * ) Notice: Subject to any disclaimer, the term of this patent is extended or adjusted under 35 U.S.C. 154(b) by 178 days.

(21) Appl. No.: 15/264,567

(22) Filed: Sep. 13, 2016

(65) Prior Publication Data

US 2018/0070562 A1    Mar. 15, 2018

(51) Int. Cl.
*A01K 27/00*    (2006.01)

(52) U.S. Cl.
CPC ................. *A01K 27/003* (2013.01)

(58) Field of Classification Search
CPC ... A01K 27/003; A01K 27/005; A01K 27/004
See application file for complete search history.

(56) References Cited

U.S. PATENT DOCUMENTS

| | | | |
|---|---|---|---|
| 5,038,719 A * | 8/1991 | McDonough | A01K 27/00 119/772 |
| 5,146,876 A * | 9/1992 | McPhail | A01K 27/005 119/798 |
| RE34,351 E * | 8/1993 | Lacey | A01K 27/005 119/776 |
| 6,230,663 B1 * | 5/2001 | Welch | A01K 27/005 119/772 |
| 7,467,604 B1 * | 12/2008 | Werner | A01K 27/00 119/770 |
| 7,779,789 B2 * | 8/2010 | Tanaya | A01K 27/00 119/770 |
| 8,360,011 B2 * | 1/2013 | Johnson | A01K 27/00 119/712 |
| 9,119,378 B2 * | 9/2015 | Schlosser | A01K 27/005 |
| 2004/0112303 A1 * | 6/2004 | Moulton, III | A01K 27/00 119/795 |
| 2007/0119385 A1 * | 5/2007 | Slank | A01K 27/005 119/776 |
| 2018/0027774 A1 * | 2/2018 | Arnold | A01K 29/00 |

* cited by examiner

*Primary Examiner* — Kristen C Hayes

(57) ABSTRACT

A pet leash structure comprises a main leash body and a drag leash. The main leash body is weaved by a strap body and has a handle portion provided for a person to hold and a connection portion connected to a collar. A pull section is formed between the handle portion and the connection portion. The drag leash has a predetermined length and is connected to a tail end of the pull section. Therefore, a distance between the person and a pet may be fixed by pulling the drag leash so that the person may quickly drag the pet back by pulling the drag leash.

4 Claims, 6 Drawing Sheets

US 10,076,101 B2

PET LEASH STRUCTURE

FIELD OF THE INVENTION

The present invention relates to a pet leash structure, and more particularly to a pet leash structure capable for immediately shortening a distance between a person and a pet to prevent the pet from bursting to result in accidents.

BACKGROUND OF THE INVENTION

Please refer to FIG. 6, it shows a perspective view of a conventional pet leash structure. The leash body 91 is a plain weave band (or an elastic). One end of the plain weave band has a hook member 92 for hooking the collar and the other end thereof has a handle member 93 which may be hold by a person.

However, the conventional pet leash structure has many disadvantages which are described as follows.

The conventional pet leash structure is mostly made by elastic yarns so as to result in that the person is dragged by the pet. It persecutes the person and makes the person tired.

In addition, the leash body must be rolled to drag the pet back because the conventional pet leash structure is made by elastics and capable for stretching a predetermined length. It is not convenient.

Furthermore, the leash body 91 made by elastics is hard to effectively prevent the pet from bursting to result in traffic accidents because the pet may struggle.

SUMMARY OF THE INVENTION

Therefore, a main objective is providing a pet leash structure. A distance between the person and a pet may be fixed by pulling the more than one drag leash so that the person may quickly drag the pet back by pulling the more than one drag leash to prevent the pet from bursting to result in traffic accident.

Another objective is providing a pet leash structure. The more than one main leash body is assembled in the more than one main leash body. The more than one main leash body has a plurality through holes. The more than one drag leash is passed through the through holes in series to hide in the more than one main leash body.

A pet leash structure may comprise more than one main leash body, weaved by a strap body and having a handle portion provided for a person to hold and a connection portion connected to a collar, and a pull section is formed between the handle portion and the connection portion; and more than one drag leash, having a predetermined length and connected to a tail end of the pull section; wherein a distance between the person and a pet may be fixed by pulling the more than one drag leash so that the person may quickly drag the pet back by pulling the more than one drag leash.

In some embodiments, the more than one drag leash is combined to the more than one main leash body by a machine sewing thread.

In some embodiments, the more than one drag leash is combined to the more than one main leash body by an adhesive.

In some embodiments, the pull section of the more than one main leash body is formed by an elastic belt, the elastic belt includes a plurality of through holes, the more than one drag leash has a fix end and a free end, the fix end is sewed on the pull section, the free end is passed through each through hole in series so as to hide the more than one drag leash in the pull section.

In some embodiments, a free end of the more than one drag leash is connected with a ring.

The pet leash structure may further comprise a reinforcing plate, the reinforcing plate is arranged at the fix end of the more than one drag leash, the fix end is clamped between the reinforcing plate and the pull section and the more than one main leash body is combined with the more than one drag leash by the machine sewing thread to enhance a connection strength therebetween.

In some embodiments, the fix end of the more than one drag leash has a rewind assembly provided for resetting the more than one drag leash.

In some embodiments, the pull section further includes a moving member, the free end of the more than one drag leash is winded the moving member first and then assembled into the through holes after the fix end of the more than one drag leash is fixed by the machine sewing thread so that the more than one main leash body may be stretched to a longer length after pulling the more than one drag leash.

In some embodiments, the more than one main leash body has a plurality of pull sections and a plurality of connection portions, each pull section is connected to the handle portion, and the number of the more than one drag leash is corresponding to the number of the pull sections.

The various objectives and advantages of the present invention will be more readily understood from the following detailed description when read in conjunction with the appended drawing.

DESCRIPTION OF THE PREFERRED EMBODIMENT

Figure 1:
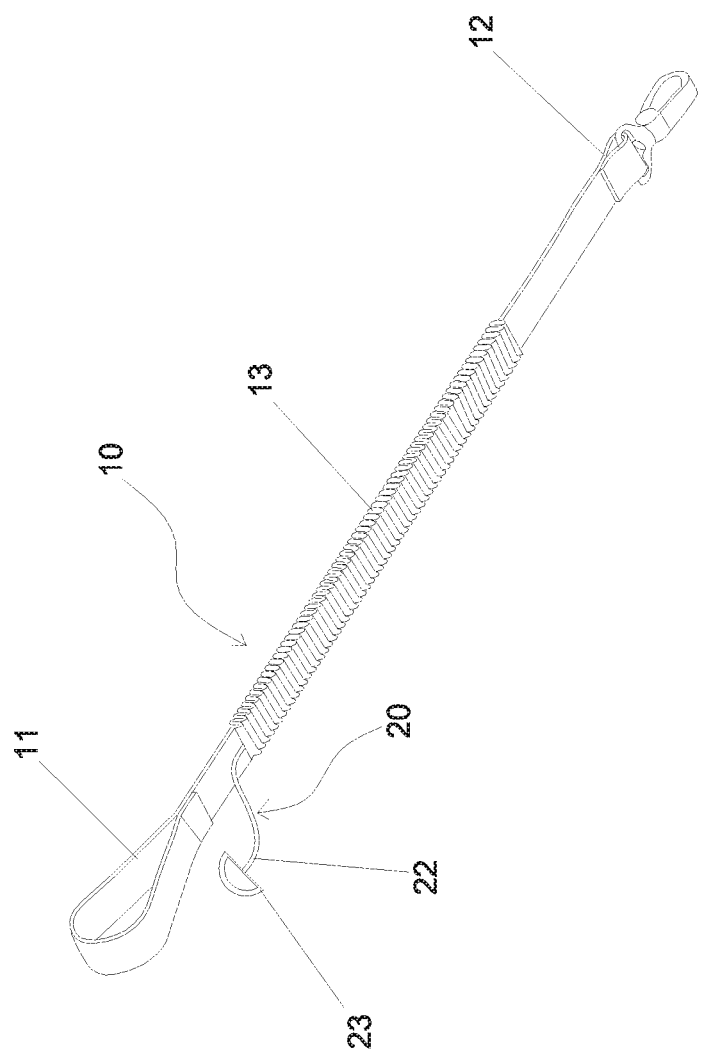
FIG. 1 is a perspective view of a pet leash structure according to present invention.
Figure 2:
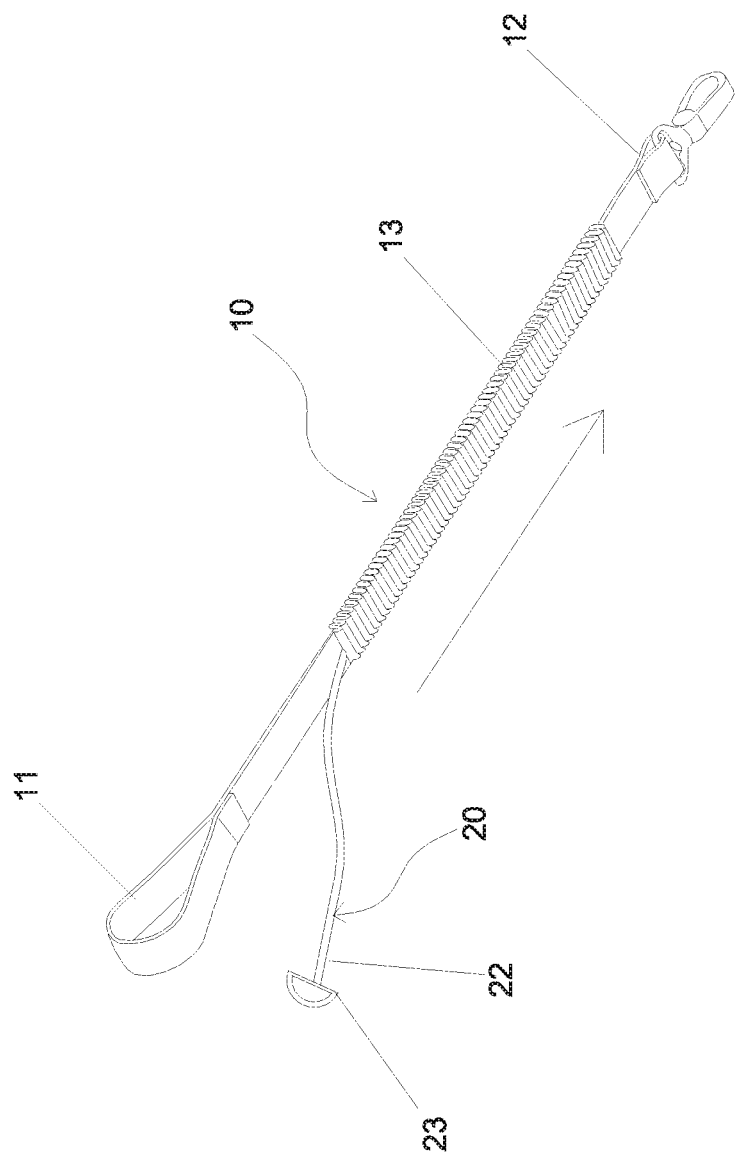
FIG. 2 is an operational view of the pet leash structure according to present invention while pulling the drag leash.

To describe clearly that the present invention achieves the foregoing objective and function, the technical features and desired function are described with reference to a preferred embodiment and accompanying drawings.

Please refer to FIG. 1 to FIG. 5, the pet leash structure may comprise more than one main leash body 10 and more than one drag leash 20.

The more than one main leash body 10 is weaved by a strap body and has a handle portion 11 provided for a person to hold and a connection portion 12 connected to a collar. A pull section 13 may be formed between the handle portion 12 and the connection portion 13.

The more than one drag leash 20 has a predetermined length and connected to a tail end of the pull section 13 of the more than one main leash body 10. The more than one drag leash 20 may be combined to the more than one main leash body 10 by a machine sewing thread.

According to above descriptions, the pet leash structure of the present invention has some advantages and effects shown as follows.

Please refer to FIGS. 1 to 5, a distance between the person and a pet may be fixed by pulling the more than one drag leash 20 so that the person may quickly drag the pet back by pulling the more than one drag leash 20 to prevent the pet from bursting to result in traffic accident.

Please refer to FIGS. 1 to 5, the pull section 13 of the more than one main leash body 10 is formed by an elastic belt. The elastic belt includes a plurality of through holes 131. The more than one drag leash 20 has a fix end 21 and a free end 22. The fix end 21 is sewed on the pull section 13 and the free end 22 is passed through each through hole 131 in series so as to hide the more than one drag leash 20 in the pull section 13. Therefore, the pet may move a short distance because the pull section 13 of the more than one main leash body 10 is formed by the elastic belt. In addition, the more than one drag leash 20 is assembled in the elastic belt to be hidden so as to beautify the more than one main leash body 10.

Please refer to FIGS. 1 to 5, the free end 22 of the more than one drag leash 20 is connected with a ring 23 so that the person may conveniently drag the pet.

Figure 3:
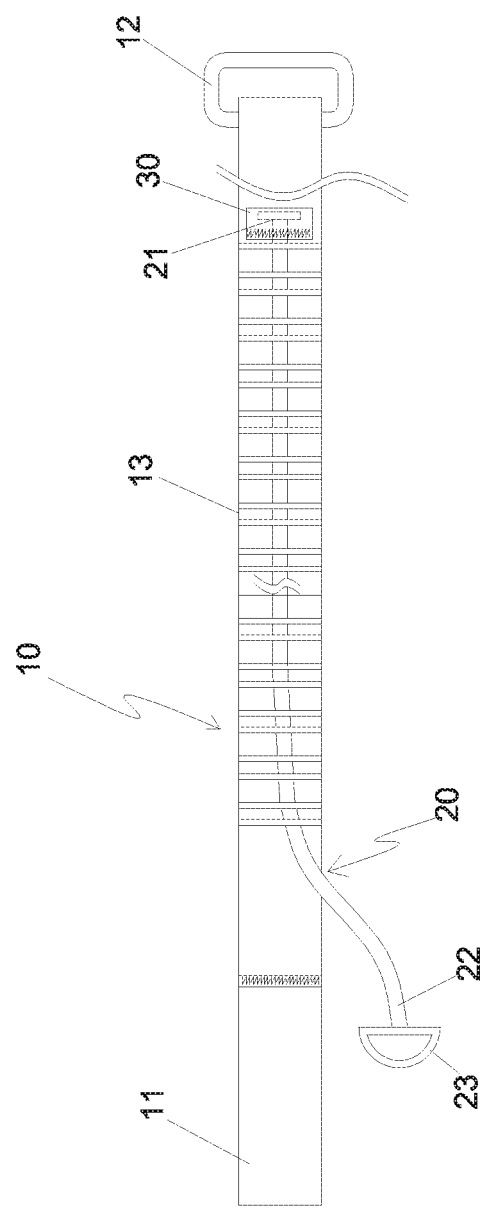
FIG. 3 is a perspective view of the pet leash structure according to present invention while being connected.
Figure 4:
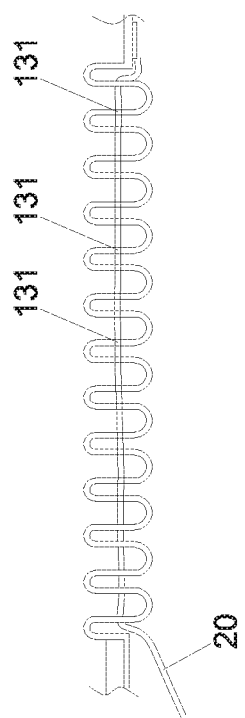
FIG. 4 is perspective view of a pull section of the pet leash structure according to present invention.
Figure 5:
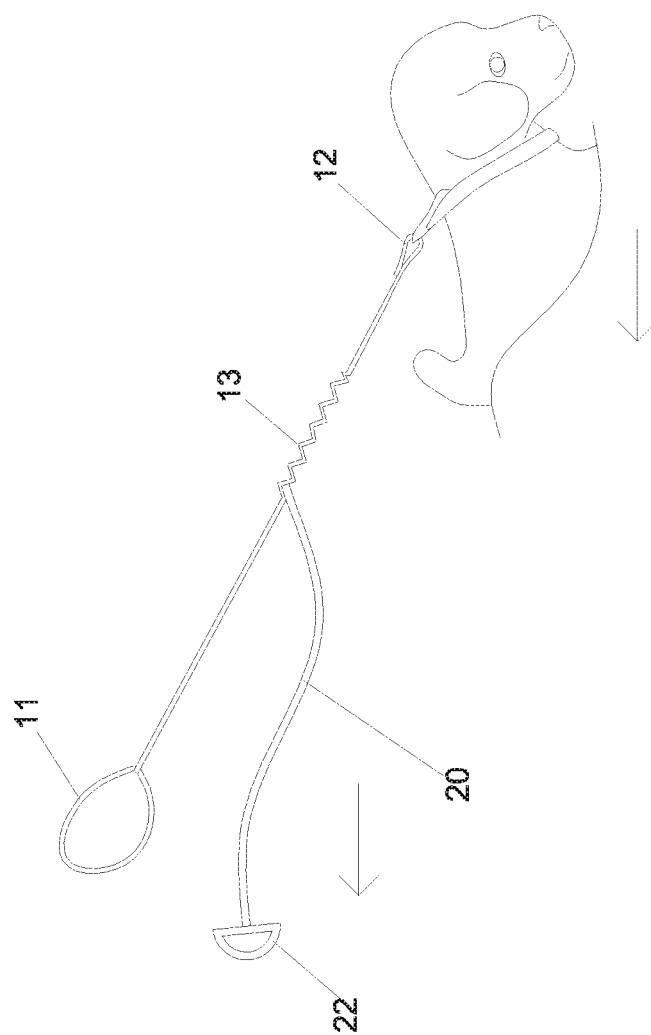
FIG. 5 is an operational view of the pet leash structure according to present invention.
Figure 6:
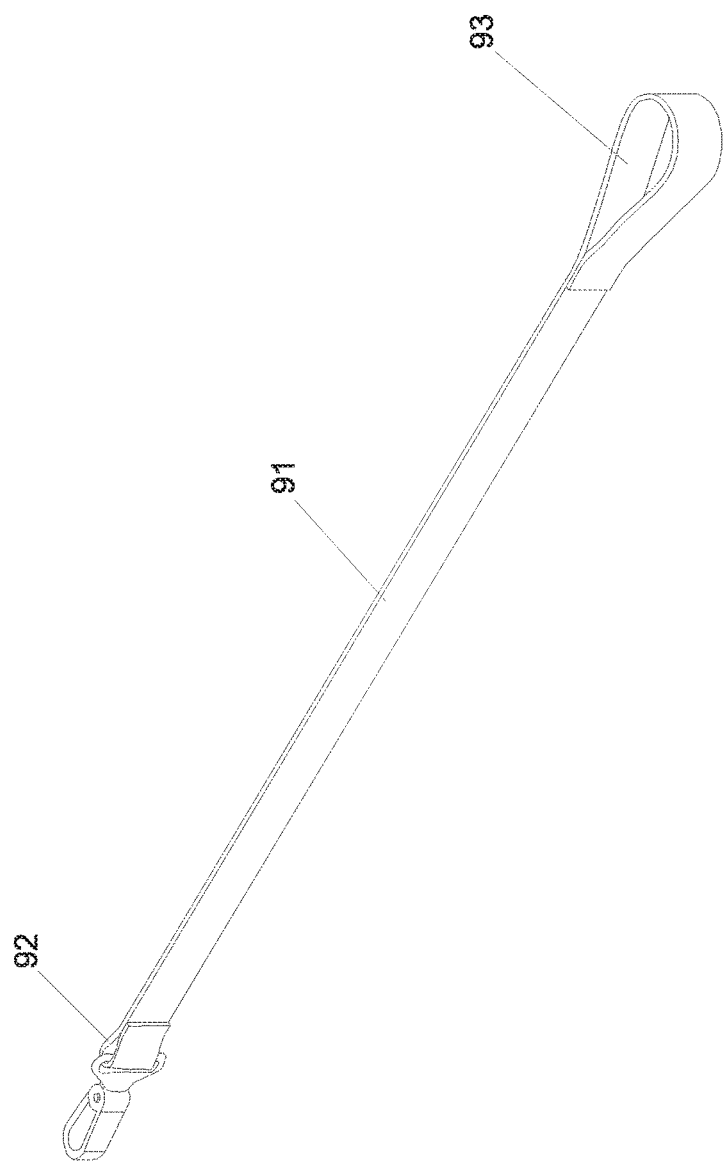
FIG. 6 is a perspective view of a conventional pet leash structure.

Please refer to FIGS. 3 and 4, a reinforcing plate 30 is further arranged at the fix end 21 of the more than one drag leash 20. The fix end 21 is clamped between the reinforcing plate 30 and the pull section 13 and the more than one main leash body is combined with the more than one drag leash 20 by the machine sewing thread to enhance a connection strength therebetween.

In some embodiment, the fix end 21 of the more than one drag leash 20 has a rewind assembly which is provided for resetting the more than one drag leash 20. The rewind assembly may be a coil spring or a rewind spring.

In some embodiment, the pull section 13 further includes a moving member. The free end 22 of the more than one drag leash 20 is winded the moving member first and then assembled into the through holes 131 after the fix end 21 of the more than one drag leash 20 is fixed by the machine sewing thread so that the more than one main leash body 10 may be stretched to a longer length after pulling the more than one drag leash 20. In addition, because the rewind rate of the free end 22 and the fix end 21 is 1 cm:2 cm, the length which the person pulls may be half of the length which the person drags back the pet. It may save power.

Besides the more than one drag leash 20 is combined to the more than one main leash body 10 by the machine sewing thread, the more than one drag leash 20 may be combined to the more than one main leash body 10 by an adhesive.

Furthermore, the more than one main leash body 20 has a plurality of pull sections 13 and a plurality of connection portions 12. Each pull section 13 may be connected to the handle portion 11. The number of the more than one drag leash 20 may be corresponding to the number of the pull sections 13. Therefore, the pets may be dragged back by the more than one drag leash 20 to prevent from accidents when taking many pets out.

In conclusion, the distance between the person and the pet(s) may be fixed by pulling the more than one drag leash 20.

The foregoing descriptions are merely the exemplified embodiments of the present invention, where the scope of the claim of the present invention is not intended to be limited by the embodiments. Any equivalent embodiments or modifications without departing from the spirit and scope of the present invention are therefore intended to be embraced.

The disclosed structure of the invention has not appeared in the prior art and features efficacy better than the prior structure which is construed to be a novel and creative invention, thereby filing the present application herein subject to the patent law.

What is claimed is:

1. A pet leash structure, comprising:
   a main leash body, weaved by a strap body and having a handle portion provided for a person to hold and a connection portion connected to a collar, and a pull section is formed between the handle portion and the connection portion; and
   a drag leash, having a predetermined length and connected to a tail end of the pull section, and the drag leash is combined to the main leash body by a machine sewing thread or an adhesive;
   wherein the pull section of the main leash body is formed by an elastic belt, the elastic belt includes a plurality of through holes, the drag leash has a fix end and a free end, the fix end is sewed on the pull section, the free end passes through each through hole in series so as to hide the drag leash in the pull section; and
   wherein a distance between the person and a pet may be fixed by pulling the drag leash so that the person may quickly drag the pet back by pulling the drag leash.

2. The pet leash structure as claimed in claim 1, wherein the free end of the drag leash is connected with a ring.

3. The pet leash structure as claimed in claim 1, further comprising a reinforcing plate, the reinforcing plate is arranged at the fix end of the drag leash, the fix end is clamped between the reinforcing plate and the pull section and the main leash body is combined with the drag leash by the machine sewing thread to enhance a connection strength therebetween.

4. The pet leash structure as claimed in claim 1, wherein the pull section further includes a moving member, the free end of the drag leash is winded the moving member first and then assembled into the through holes after the fix end of the drag leash is fixed by the machine sewing thread so that the main leash body may be stretched to a longer length after pulling the drag leash.

* * * * *